United States Patent [19]

Takashima

[11] 4,038,069
[45] July 26, 1977

[54] HEAT-INSULATING AGENT FOR MOLTEN METAL

[75] Inventor: Masaru Takashima, Tokyo, Japan

[73] Assignee: Aikoh Co., Ltd., Tokyo, Japan

[21] Appl. No.: 652,017

[22] Filed: Jan. 26, 1976

Related U.S. Application Data

[63] Continuation of Ser. No. 515,755, Oct. 17, 1974, abandoned.

[30] Foreign Application Priority Data

Oct. 17, 1973   Japan .................................. 48-115853

[51] Int. Cl.$^2$ ............................................. C22B 9/00
[52] U.S. Cl. ........................................... 75/96; 75/53; 75/58; 75/93 R
[58] Field of Search ........................... 75/53, 58, 93, 96

[56] References Cited

U.S. PATENT DOCUMENTS

| 2,092,595 | 9/1957 | Spowers | 75/96 |
| 3,704,230 | 11/1972 | Loricchio | 75/58 |

Primary Examiner—Peter D. Rosenberg
Attorney, Agent, or Firm—Sughrue, Rothwell, Mion, Zinn and Macpeak

[57] ABSTRACT

A heat-insulating agent for molten metal comprising a burned material obtained by light-burning a dehydrate of sludge discharged in pulping/or paper-making procedures and a method of insulating a molten metal from loss of heat comprising covering the surface of the molten metal with a layer of the heat-insulating agent.

5 Claims, No Drawings

HEAT-INSULATING AGENT FOR MOLTEN METAL

This application is a continuation of Ser. No. 515,775, filed Oct. 17, 1974, and now abandoned.

BACKGROUND OF THE INVENTION

1. Field of the Invention

The present invention relates to a heat-insulating agent for molten metal, which is used to cover a molten metal surface to thereby prevent the molten metal from being cooled or oxidized.

2. Description of the Prior Art

As a heat-insulating agent for molten metal, so far organic materials such as grain stems, gain seed husks, saw dust, etc., carbonaceous materials obtained by carbonizing these organic materials, and refractory materials such as vermiculite, diatomaceous earth, expanded perlite, alumina, silica sand, aluminum ash, etc., alone or in combination, have been used. Also, a heat-insulating and exothermic agent containing both an easily oxidizable metal powder such as aluminum or magnesium and an oxidizing agent such as iron oxide or a nitrate, etc., in combination, with the above described material has been used.

However, these heat-insulating agents have the following disadvantages.

With the above-described organic materials and the carbonized materials thereof, the time during which these materials are heat-insulating is short because these materials are easily burned by the heat of the molten metal and substantially disappear. Therefore, a large volume of these materials is required to heat-insulate for a long period of time. In addition, it is very difficult to handle or use these materials due to their low bulk density.

With the above-described refractory materials, the heat-insulating effect is insufficient and heat-insulating is particularly poor where the material is melted by the heat of molten metal.

Also, the above-described heat-insulating and exothermic agent provides satisfactory results for an extremely short period of time. However, this combination is not suitable for heat-insulating for the period of time ordinarily employed, because the heat-insulating property of the residue formed by the exothermic reaction is poor.

SUMMARY OF THE INVENTION

An object of the present invention is to provide a heat-insulating agent having good heat-insulating properties which is capable of preventing molten metal, particularly molten metal in a ladle or the like, from being cooled or oxidized, and which is capable of preventing generation of a shrinkage cavity, commonly known as a pipe, in the body of a product which is cast, by heat-insulating the metal in the feeder head.

Also, an object of the invention is to provide a heat-insulating agent which overcomes the deficiencies of the prior art.

Another object of the invention is to utilize the sludge discharged in pulping and/or paper-making procedures which is difficult to treat or throw away.

The present invention provides a heat-insulating agent for molten metal capable of minimizing or eliminating the above-described disadvantages of the prior art. The heat-insulating agent of the invention comprises a burned material obtained by light-burning a dehydrate of sludge discharged in pulping and/or paper-making procedures. With the burned material, it is preferred that the carbon content should be about 5 to 30% by weight, the bulk density be not higher than about 0.5 g/cc and the particle size be not larger than about 20 mm.

A further embodiment of this invention comprises a method of insulating a molten metal from loss of heat comprising covering the surface of the molten metal with a layer of the heat-insulating agent.

DETAILED DESCRIPTION OF THE INVENTION

The above-described sludge is contained in waste water discharged at the time of producing pulp or making paper, and contains fine fiber of pulp, lignin, various chemicals for paper-making or pulping, materials formed by the action of these chemicals, and the like. The dehydrate of the sludge from a cylinder press or the like contains about 60 to 90% by weight water and about 10 to 40% by weight solids (organic material: about 40 to 80% by weight; ash content: about 20 to 60% by weight).

The light-burning of the dehydrate is conducted at a temperature of about 300° to 1,000° C in a burning furnace such as an incinerator or the like. In this burning, it is preferred that organic materials contained in the sludge should not be burned completely but rather be carbonized so that the burned material contains about 5 to 30% by weight carbon. The time period for the burning cannot be defined unequivocally since it greatly varies depending upon the temperatures, the amounts of raw materials fed, etc., but the time period ranges from about 10 minutes to 5 hours, generally.

Also, it is preferable that the dehydrate of the sludge should be light-burned so that the burned material has a bulk density less than about 0.5 g/cc and a particle size smaller than about 20 mm. More specifically, the burned material of this invention has a bulk density of from about 0.2 to 0.5 g/cc and further contains more than 90% by weight of materials having a particle size of about 0.2 to 20 mm. This is in striking contrast to prior art organic materials and the carbonized materials thereof which each, in general, have a bulk density of less than about 0.2 g/cc.

The burned materials exerts sufficient influence as a heat-insulating agent for molten metal when used alone or in combination with a conventional heat-insulating agent or other materials. Therefore, both the burned material per se and a mixture thereof with other materials, e.g., a conventional heat-insulating agent, are included in the present invention. When a conventional heat-insulating material is employed in combination with the heat-insulating agent of this invention, a suitable proportion of the conventional heat-insulating material to the heat-insulating agent of this invention can range from about 10 : 90 to 90 : 10 by weight.

The burned material contains less than about 40% by weight of carbon, residual organic material, etc. which will burn or evaporate to disappear upon being ignited. That is, its ignition loss is less than about 40%. The combustion rate of the burned material is slow, since it has an ash content higher than about 60% by weight. Also, its burned residue, i.e., the ash, has extremely good heat-insulating properties.

Accordingly, where the burned material is used for heat-insulating of molten metal, the heat-insulating agent of this invention is more effective even when used in a small amount than conventional heat-insulating agents such as organic materials and the carbonized materials thereof. That is because its ignition loss due to the heat of the molten metal is small and the combustion rate of the heat-insulating agent of this invention effected by the heat of the molten metal is slow.

It is preferred that the carbon content of the burned material be in the range of about 5 to 30% by weight for the following reasons. If the carbon content is less than about 5% by weight, the heat-insulating property of the burned material is degraded since the combustion heat of the carbon cannot be utilized for heat-insulating. On the other hand, if the carbon content exceeds about 30% by weight, the heat-insulating property is also diminished since the combustion rate of the carbon is very fast, and because the residue after the combustion, i.e., the ash, is so small that the burned material becomes unsuitable for heat-insulating for a long period of time.

It is preferred that the bulk density of the burned material should be not greater than about 0.5 g/cc, because, if the bulk density exceeds about 0.5 g/cc, the heat-insulating property is seriously diminished. Also, it is preferred that the particle size of the burned material should be in the range of not larger than about 20 mm, because, if the particle size exceeds about 20 mm, the voids between the particles of the burned material become so large that the heat-insulating property is diminished.

The present invention will now be explained in greater detail by reference to the following Examples of some desirable embodiments of the present invention. Unless otherwise indicated, all parts, percents, etc., are by weight.

EXAMPLE 1

A dehydrate of sludge discharged in pulping and/or paper-making procedures comprising about 80% by weight of water and about 20% by weight of solids which comprised about 53% by weight of organic materials and about 47% by weight of ash content was used. The dehydrate was light-burned for about 2.5 hours at a temperature of about 600° C in a burning furnace to produce a burned material. The resulting burned material had a carbon content of about 12.6%, a bulk density of about 0.29 g/cc and a particle size of not more than 5 mm. The ignition loss of the dehydrate was 19.7%.

Molten steel was poured from a furnace into a 60-ton ladle. 60Kg of the above described burned material was added as a heat-insulating agent for the molten steel to the surface of the molten steel immediately after the pouring. The thickness of the heat-insulating agent covering the surface was about 37 mm at the time the addition was completed.

The temperatures of the molten steel were taken at the stages as shown in Table 1 below. Table 1 shows the temperatures of the molten steel at the time of tapping the molten steel from the furnace and the tendency of the temperature of the molten steel in the ladle to decrease. The numbers given in Table 1 show the decrease in temperature in ° C at specific times after tapping the molten steel.

Test No. 4 was conducted according to a conventional heat-insulating method using 60Kg of baked rice husks. The thickness of the baked rice husks covering the surface of the molten steel was about 50 mm at the time the addition was completed.

Table 1

| Test No. | Temperature of Molten Steel at the Tap (° C) | Temperature Decrease after Pouring (° C) | | | | | |
|---|---|---|---|---|---|---|---|
| | | 10 minutes | 20 minutes | 40 minutes | 60 minutes | 80 minutes | 100 minutes |
| 1 | 1605 | 43 | 46 | 49 | 54 | 61 | 69 |
| 2 | 1613 | 47 | 52 | 55 | 64 | 71 | 78 |
| 3 | 1598 | 44 | 48 | 54 | 57 | 66 | 72 |
| 4 | 1608 | 43 | 49 | 58 | 71 | — | — |

As is shown by the results in Table 1, the heat-insulating property of this burned material did not deteriorate very much, and the ash residue of the burned material served as a good heat-insulator, since 83% of the burned material was ash. In contrast, the conventional heat-insulating agent of baked rice husks burned so easily that the heat-insulating property was sharply reduced within 20 to 50 minutes after the addition of the conventional heat-insulating agent to the molten steel. Additionally, the ignition loss of the baked rice husks was about 60%.

EXAMPLE 2

A dehydrate of sludge discharged in pulping and/or paper-making comprising about 80% by weight of water and about 20% by weights solids comprising about 59% by weight organic materials and about 41% by weight ash content was used as the heat-insulating agent of the invention. The dehydrate was light-burned for about 2.5 hours at a temperature of about 500° C in a burning furnace to produce a burned material. The resulting burned material had a carbon content of about 13.4%, a bulk density of about 0.26 g/cc, and a particle size of not larger than about 8 mm. The ignition loss of the heat-insulating agent was about 23.5%.

A mixture of 20 % by weight of this burned material and 80% by weight of a conventional heat-insulating agent for a feeder head was used for the feeder head as the heat-insulating agent of the present invention. Molten steel was poured using a top-pouring method into an ingot mold whose upper part was lined with slabs for heat-insulating the feeder head. Then, the surface of this molten steel was covered with 20 Kg of the above described heat-insulating agent of the present invention to make a 10-ton ingot. 10 ingots produced according to this process were compared with ingots made using 20Kg of the above described conventional heat-insulating agent of burned or carbonized rice husks in place of the heat-insulating agent of the present invention.

As a result, it was found that the average yield of the ingots made using the heat-insulating agent of the present invention was improved by 0.9% as compared with the average yield of ingots made using the conventional heat-insulating agent.

The heat-insulating agent for molten metal of the present invention can be applied to non-ferrous metals such as aluminum and copper. In addition, a heat-insulating molding, containing the burned material and produced by using a binder, is also included within the scope of the present invention. Suitable binders which can be employed in this invention, include any conventional binders and typical examples of suitable binders are formaldehyde resins, urea formaldehyde resins, furan resins, starch, dextrin, sodium silicate, cement, aluminum phosphate, etc. in a proportion of about 3 to 30% by weight of the binder to the total product weight.

While the invention has been described in detail and with reference to specific embodiments thereof, it will be apparent to one skilled in the art that various changes and modifications can be made therein without departing from the spirit and scope thereof.

What is claimed is:

1. A heat-insulating agent for molten metal which comprises a burned material containing about 5 to 30% by weight carbon which is obtained by light-burning a dehydrate of sludge discharged in pulping or paper-making procedures, said sludge containing pulp fibers, lignin and chemicals conventionally employed in pulping processes, said dehydrate containing about 60 to 90% by weight water and about 10 to 40% by weights solids, said solids including about 40 to 80% by weight organic material and about 20 to 60% by weight ash.

2. The heat-insulating agent according to claim 1, wherein the burned material has a bulk density of not higher than about 0.5 g/cc.

3. The heat-insulating agent according to claim 1, wherein the burned material has a particle size of not larger than about 20 mm.

4. The heat-insulating agent according to claim 2, wherein the burned material has a particle size of not larger than about 20 mm.

5. A method of insulating a molten metal from loss of heat comprising covering the surface of the molten metal with a layer of the heat-insulating agent of claim 1.

* * * * *